(12) United States Patent
Erickson et al.

(10) Patent No.: US 11,334,624 B2
(45) Date of Patent: May 17, 2022

(54) CURATING OPERATIONAL HISTORIAN DATA FOR DISTRIBUTION VIA A COMMUNICATION NETWORK

(71) Applicant: AVEVA Software, LLC, Lake Forest, CA (US)

(72) Inventors: Brian K. Erickson, Long Beach, CA (US); Greg C. Clinton, Mission Viejo, CA (US); Vinay T. Kamath, Rancho Santa Margarita, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 2 days.

(21) Appl. No.: 16/514,432

(22) Filed: Jul. 17, 2019

(65) Prior Publication Data

US 2020/0012683 A1 Jan. 9, 2020

Related U.S. Application Data

(63) Continuation of application No. 15/270,898, filed on Sep. 20, 2016, now abandoned.

(60) Provisional application No. 62/221,424, filed on Sep. 21, 2015.

(51) Int. Cl.
*G06F 16/901* (2019.01)
*G05B 23/02* (2006.01)

(52) U.S. Cl.
CPC ....... *G06F 16/901* (2019.01); *G05B 23/0254* (2013.01); *G05B 23/0272* (2013.01); *G05B 2219/25232* (2013.01); *G05B 2219/32222* (2013.01); *Y02P 90/02* (2015.11)

(58) Field of Classification Search
CPC ............. G06F 16/901; G05B 23/0254; G05B 23/0272
See application file for complete search history.

(56) References Cited

U.S. PATENT DOCUMENTS

| | | | |
|---|---|---|---|
| 2009/0138306 A1 | 5/2009 | Coburn et al. | |
| 2010/0211192 A1* | 8/2010 | Stluka | G05B 23/0272 700/12 |
| 2014/0222394 A1 | 8/2014 | Drees et al. | |
| 2016/0131388 A1 | 5/2016 | Eiynk et al. | |
| 2016/0370771 A1* | 12/2016 | Torres Fuchslocher | G05B 13/0255 |

* cited by examiner

*Primary Examiner* — Nathan L Laughlin
(74) *Attorney, Agent, or Firm* — Greenberg Traurig, LLP

(57) ABSTRACT

Targeted distributing of reports containing historical process control information to particular user devices via a communications network. A curating service permits assigning a score to each report based on an interest level value of the historical process control information to a user associated with each user device and/or an urgency value of the historical process control information. Routing reports to user devices based on the score raises visibility of the historical process control information without overburdening the communications network.

14 Claims, 15 Drawing Sheets

CURATING OPERATIONAL HISTORIAN DATA FOR DISTRIBUTION VIA A COMMUNICATION NETWORK

CROSS-REFERENCE TO RELATED APPLICATION

This application is a continuation application of U.S. patent application Ser. No. 15/270,898, filed Sep. 20, 2016, entitled "Curating Operational Historian Data for Distribution via a Communication Network", which claims the benefit of and priority to U.S. Provisional Patent Application Ser. No. 62/221,424, filed Sep. 21, 2015, entitled "Operational Historian Data Pattern Detection and Communication Services." The entire contents of which are hereby incorporated by reference.

TECHNICAL FIELD

Aspects of the present disclosure generally relate of the fields of networked computerized industrial control automation systems and networked computerized systems utilized to monitor, log, and display relevant manufacturing/production events and associated data, and supervisory level control and manufacturing information systems. More particularly, aspects of the present disclosure relate to systems and methods for transforming stored data into actionable metrics for transmitting to various devices.

BACKGROUND

Such systems generally execute above a regulatory control layer in a process control system to provide guidance to lower level control elements such as, by way of example, programmable logic controllers or distributed control systems (DCSs). Such systems are also employed to acquire and manage historical information relating to industrial processes and their associated outputs. "Historization" is a vital task in the industry as it enables analysis of data representing historical information to improve industrial processes.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Distributing the entire volume of data all user devices overburdens communications networks and unnecessarily utilizes network resources by sending data irrelevant to users associated with one or more user devices.

SUMMARY

Aspects of the disclosure permit targeted distributing of reports containing Information that is of interest to particular users via a communications network. A curating architecture permits scoring each report based on interest level values and/or urgency level values. Routing reports to user devices based on the scores raises visibility of historical process control information without overburdening the communications network.

A method embodying aspects of the disclosure includes a curating service retrieving reports from a report database. Each report includes historical data relating to process control tags associated with a process control system. The curating service comprises processor-executable instructions executing on a processor. The curating service assigns a score to each retrieved report based on an interest level value and/or an urgency value. A scored report is routed from the curating service, by transmission via a communications network, to a user device when its score is at least equal to a threshold value. In response to the transmission, the report displays on the user device.

A system embodying aspects of the disclosure includes a processor, a computer-readable storage device, a report database, and a curating service. The report database stores reports that each includes historical data relating to process control tags associated with a process control system. The curating service comprises processor-executable instructions stored on the computer-readable storage device. When executed by the processor, the instructions retrieve reports from the report database, assign a score to each retrieved report based on an interest level value and/or an urgency value, and route a scored report to a user device. The scored report is routed by transmitting it via a communications network to the user device when the score is equal to or greater than a threshold value. In response to the transmission, the report displays on the user device.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
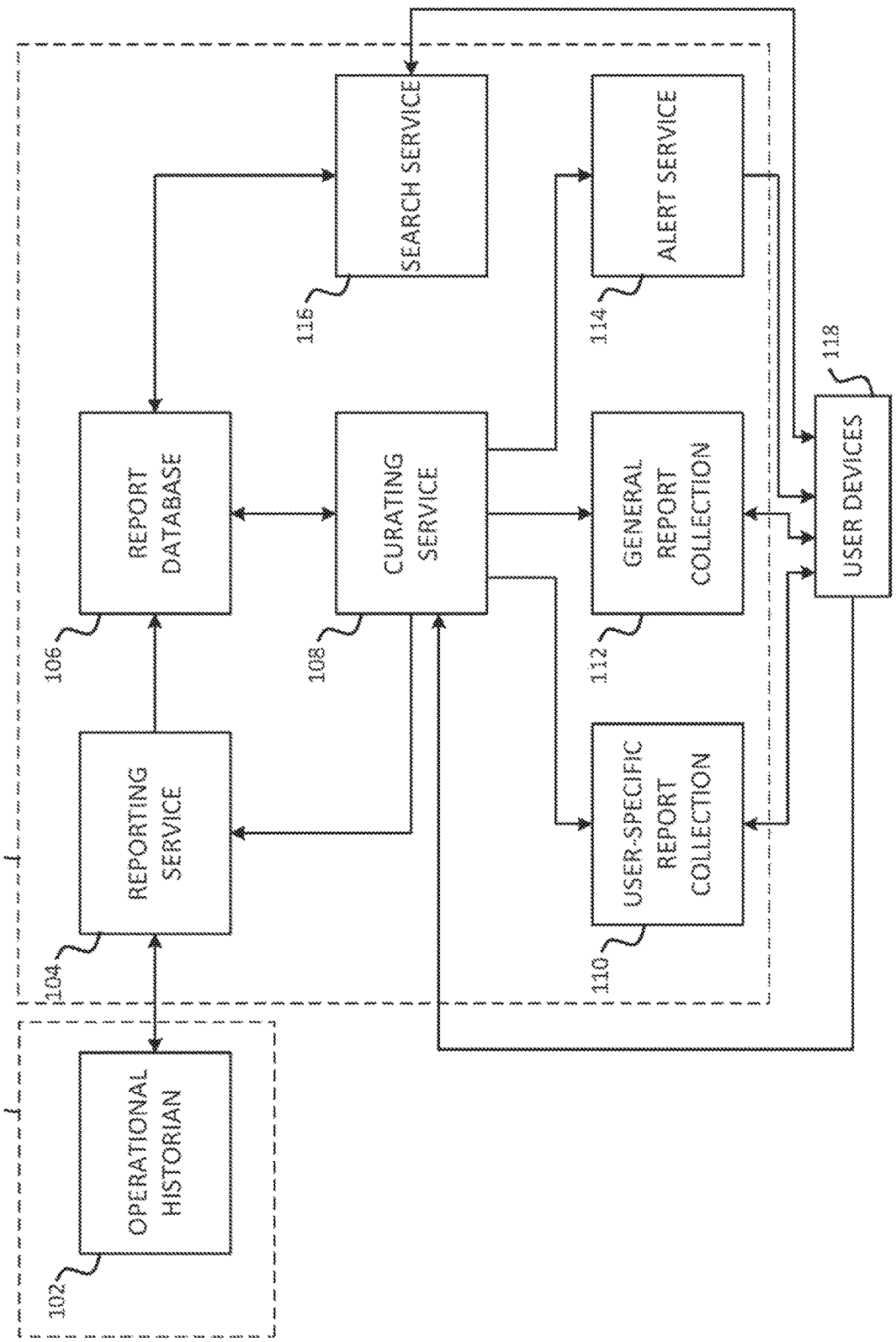
FIG. 1 illustrates an operational historian data pattern detection and communication services system according to an embodiment.

Referring to FIG. 1, an operational historian data pattern detection and communication services system, generally indicated at 100, analyzes data stored in an operational historian and transforms that data into timely reports that are communicated to appropriate devices at appropriate times and manners. In this manner, aspects of the system 100 filters (e.g., curates) the data in order to raise visibility of the data to users (e.g., via user devices) without overwhelming them and/or overburdening communications networks. The system 100 includes an operational historian 102, a reporting service 104, a report database 106, a curating service 108, a user-specific report collection 110, a general report collection 112, an alert service 114, and a search service 116. In an embodiment, system 100 provides a historian news feed of generated reports (i.e., stories) for users based on data provided by an operational historian and/or other providers.

In an embodiment, the operational historian 102 is adapted to store (e.g., "historize") various types of data related to an industrial process. Exemplary data includes, but is not limited to, time-series data, metadata, event data, configuration data, raw time-series binary data, tag metadata, diagnostic log data, and the like. The operational historian 102 is also adapted to record trends and historical information about the industrial process for future reference. An exemplary operational historian 102 stores data about various aspects of an industrial process in quantities that humans cannot interpret or analyze. For example, an operational historian may receive two million or more data values (e.g., tags relating to process control components, process variables, etc.) every second. In an embodiment, historian 102 comprises processor-executable instructions embodied on a storage memory device (e.g., as part of a server computing device) to provide the operational historian 102 via a software environment. An exemplary operational historian 102 includes Wonderware® Historian and Wonderware® Online provided by Schneider Electric.

The reporting service 104 illustrated by FIG. 1 is adapted to retrieve data from operational historian 102, detect patterns in the retrieved data, generate reports that include information about the detected patterns, and store the generated reports in the report repository, such as a database 106. In an embodiment, reporting service 104 comprises processor-executable instructions embodied on a storage memory device to provide reporting service 104 via a software environment. For example, reporting service 104 may be provided as processor-executable instructions that comprise a procedure, a function, a routine, a method, and/or a subprogram utilized independently or in conjunction with additional aspects of system 100 by computing device 103 according to an exemplary embodiment of the disclosure. Further details of reporting service 104 are provided herein.

Figure 2:
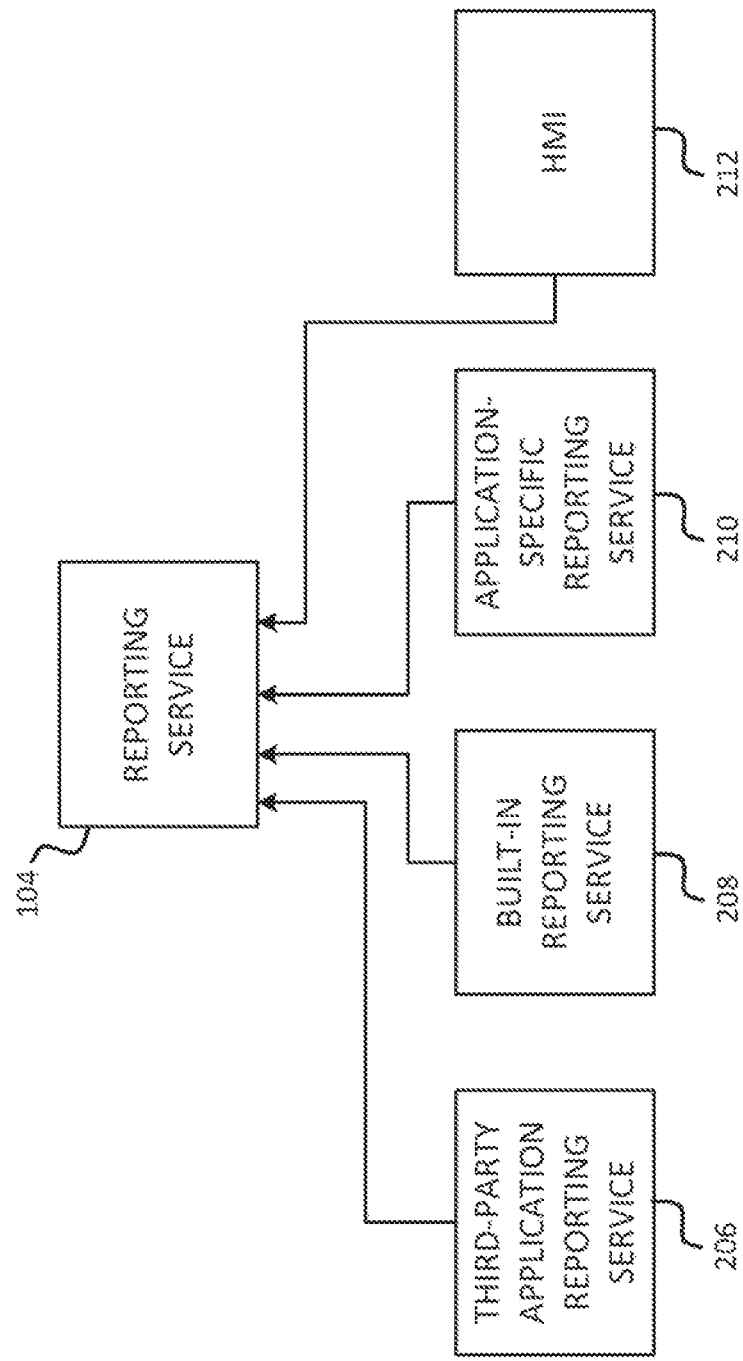
FIG. 2 illustrates a reporting service of the operational historian data pattern detection and communication services system of FIG. 1.

In an embodiment, reporting service 104 is adapted to retrieve data from operational historian 102 by transmitting a query to operational historian 102, which operational historian 102 receives and uses to select stored data that matches the query. The operational historian 102 then transmits the selected data to reporting service 104. The reporting service 104 may retrieve data continuously or at regular intervals. In the embodiment illustrated by FIG. 2, reporting service 104 retrieves and/or receives data from additional sources, including external third-party reporting applications 206 (e.g., via an Application Programming Interface (API) of reporting service 104), built-in reporting services (e.g., Wonderware® Online built-in reporters) 208, application specific reporting services based on a client application configuration 210, and a Human Machine Interface (HMI) 212. It will be understood by one having skill in the art that additional reporting entities may be utilized to extend the capability of reporting service 104. For example, a framework for adding additional reporting services 104 gives aspects of the disclosure extensibility and "verticals" readiness.

Referring again to the embodiment of FIG. 1, reporting service 104 is adapted to analyze the data using algorithms and to detect certain patterns (e.g., "pattern of interest") and/or non-conformities in the data. Exemplary algorithms include statistical algorithms, machine learning algorithms, rules-based algorithms, and the like. Upon detecting certain patterns, reporting service 104 generates reports about these detected patterns. In an exemplary embodiment, a report includes text, graphics (e.g., graphs, images, etc.), and metadata. The reports may include the information about the detected patterns in a format that is amenable to the curating service 108 and/or a format that is human-understandable when displayed via a display device and/or a Human Machine Interface device. In this manner, reporting service 104 transforms the data from a format that is unintelligible to curating service 108 and humans into a format that is intelligible to curating service 108 and humans when displayed via a device.

After generating the reports, reporting service 104 transmits the reports to the report database 106 for storage. The reporting service 104 is configurable to transmit the reports to report database 106 via an HTML interface, a REST interface, an ODATA interface, and similar interfaces. In an embodiment, system 100 includes a plurality of reporting services 104 that each retrieve data from operational historian 102, detect patterns in the data, generate reports, and store the reports in report database 106. In an embodiment that utilizes a plurality of reporting services, each reporting service may operate independently or the collective operating services may operate in parallel on portions of a larger reporting task.

The report database 106 is adapted to store reports as an organized collection of data. In this manner, report database 106 stores the reports in a central location for access by various systems and devices.

Still referring to FIG. 1, curating service 108 is adapted to intelligently review reports stored in database 106, rank and/or classify reviewed reports, and route (e.g., distribute) ranked reports to collections, devices, other services, and the like. In an embodiment, curating service 108 moderates reports and raises their visibility to users at a certain frequency and in a certain manner such that users will not be overwhelmed with data, but instead will be provided with useful information in the reports at times and manners that are most appropriate for each specific user or groups of users. For example, for each user, curating service 108 determines whether a particular report should appear on a primary/front page of a feed for that user, on a secondary page for that user, or just be archived in a searchable format for that user. By distributing relevant reports to certain user devices, curating service 108 reduces the burden on communications networks. The curating service 108 is configurable to take additional actions based on the relevance of a particular report for a particular user, such as beep or alert a user device 118 of the user, as further described herein. In another embodiment, curating service 108 functions as a filter to determine which of the multitude of reports in report database 106 are transmitted to certain users and at which times those reports are transmitted.

In an embodiment, curating service 108 comprises processor-executable instructions embodied on a storage memory device to provide curating service 108 via a software environment. For example, curating service 108 is embodied by processor-executable instructions that comprise a procedure, a function, a routine, a method, and/or a subprogram utilized independently or in conjunction with additional aspects of system 100 by computing device 103 according to an exemplary embodiment of the disclosure. Further details of curating service 108 are provided herein.

According to an embodiment of the disclosure, curating service 108 is adapted to utilize passive evaluation factors to intelligently review reports stored in database 106. As reports are received by database 106 from reporting service 104, curating service 108 is adapted to give each report a general score and a per-user score based on various factors. Exemplary factors based on report content include, but are not limited to, tags on the same chart, tags on the same window, tags on the same analysis, SmartGlance reports, tags from the same data source, tags with similar names, tags with similar summary statistics, correlated tags, and the like. Exemplary factors based on actions taken by users include, but are not limited to, selecting (e.g., clicking, tapping, etc. via a HMI) on a report, selecting a related tag, search history, actions of similar users (e.g., operators of a particular subsystem, all operators, all managers, etc.), and the like. Actions taken by users may be provided as feedback from user devices 118 to curating service 108, in an exemplary embodiment. The curating service 108 is also adapted to utilize factors based on deliberate user actions such as voting, answering polls on reports (e.g., "thumbs up", "not a problem", etc.), and the like. Furthermore, curating service 108 is adapted to utilize a specific assignment of certain tags, process control devices, and the like to a certain user in determining the general and per-user scores.

The curating service 108 illustrated in FIG. 1 is adapted to rank, for each user or user group, reviewed reports based on report content and data regarding user interest patterns. In an exemplary embodiment, curating service 108 ranks reports with respect to an operator of a particular subsystem of an industrial process. When an intelligent review of a report by curating service 108 reveals that the report concerns a component in the operator's subsystem, curating service 108 is adapted to rank that report higher with respect to the operator than a report about a component in a different subsystem for which the operator is not responsible. In another exemplary embodiment, curating service 108 is adapted to use data regarding component information regularly viewed by the operator (e.g., via a user profile) and when an intelligent review of a report by curating service 108 reveals that the report concerns a component that the operator regularly views curating service 108 is adapted to rank that report higher with respect to the operator than a report about items that the operator does not regularly view. In an embodiment, the ranking performed by curating service 108 is a numerical ranking or score. However, it will be understood by one skilled in the art that any ranking or scoring mechanism may be utilized that indicates a higher relevance or importance of one report over a different report. In an embodiment, report ranking is made available to reporting service 104 which reporting service 104 uses to tailor report generation to generate more highly ranked reports. In an embodiment, curating service 108 directs reports to user devices 118 based on context including, but not limited to, area(s) of interest, a user's own events, and events of other operators in a team.

The curating service 108 is also adapted to utilize the ranking of reports to classify the reports and determine which actions to take with respect to a particular report. For example, curating service 108 classifies and routes reports based on a general interest level (e.g., score), a user-specific interest level (e.g., score), and/or urgency. In an exemplary embodiment, curating service 108 determines based on the ranking of a report to not forward that report to any device or user but instead continue to store the report in database 106 where it is available for accessing via the search service 116. In another embodiment, curating service 108 determines based on the ranking of a report to transmit the report to the user-specific report collection 110. In another embodiment, curating service 108 determines based on the ranking of a report to transmit the report to the general report collection 112. In yet another embodiment, curating service 108 determines based on the ranking of a report to transmit the report in real-time in the form of an alert to one or more user devices 118 via an alert service 114. Additional actions curating service 108 may take based on a classification of a report include displaying the report as a news story on a news feed, displaying the report as an activity on related trends, displaying the report only when searched via search service 116, and displaying reports on related process graphics (e.g., displaying a line plot of a particular property of an industrial process with its anomalies annotated).

As described above, curating service 108 classifies and routes reports based on urgency and/or other time-based factors according to embodiments of the present disclosure. For example, curating service 108 determines that a report includes content that is time-sensitive and/or highly consequential to an industrial process and transmit the report to user devices 118 via alert service 114 in addition to and/or rather than general report collection 112. In another exemplary embodiment, curating service 108 analyzes the volume of reports generated by reporting service 104 over a given time period (e.g., work shift, day, etc.) and distributes reports accordingly. For example, when the volume of reports generated by reporting service 104 is low during a particular day (e.g., a "slow" news day), curating service 108 distributes fewer reports with lower rankings. In a contrasting example, when the volume of reports generated by reporting service 104 is high during a particular day (e.g., a "fast" news day), curating service 108 distributes more and higher ranked reports. Such an urgency-based operation of curating service 108 may also be used to distribute a consistent volume of reports over a given time period (e.g., 100 reports per day, etc.) such that curating service 108 alters the ranking threshold in order to achieve the requisite number of reports. The urgency-based operation of curating service 108 may also be used alter the ranking threshold such that only highly ranked (e.g., 95 out of 100, etc.) reports are published during a certain time period (e.g., days that a manager is scheduled to be on vacation, etc.).

Still referring to FIG. 1, the user-specific report collection 110 is adapted to receive reports from curating service 108 and organize the reports into lists (e.g., feeds) that are kept current and made available to users and/or groups of users via user devices 118. For example, user-specific report collection 110 may be a database, according to an aspect of the disclosure. In an embodiment, user-specific report collection 110 provides feeds that indicate new reports that have not yet been accessed by user devices 118 and/or reports that have not been displayed by user devices 118. The general report collection 112 is adapted to receive reports from curating service 108 and present them in a manner such that they may be browsed through via user devices 118. For example, general report collection 112 may be a database, according to an aspect of the disclosure. In exemplary embodiment, general report collection 112 organizes reports in such a way to support navigation of the reports via user devices 118. In another exemplary embodiment, general report collection 112 organizes reports such that reports having higher general relevance to an industrial process than other reports are stored in a manner such that those reports are displayed in more prominent positions when accessed and displayed via user devices 118.

Referring again to FIG. 1, alert service 114 is adapted to receive reports from curating service 108 and deliver received reports to user devices 118 in real-time. For example, alert service 114 may deliver reports to user devices 118 in the form of emails, text messages, mobile device notifications (e.g., user interface notification), pager notification, and the like. In an embodiment, alert service 114 comprises processor-executable instructions embodied on a storage memory device to provide alert service 114 via a software environment. For example, alert service 114 may be provided as processor-executable instructions that comprise a procedure, a function, a routine, a method, and/or a subprogram utilized independently or in conjunction with additional aspects of system 100 by computing device 103 according to an exemplary embodiment of the disclosure. Further details of alert service 114 are provided herein. In an embodiment, alerts from alert service 114 are more important than reports.

The search service 116 of FIG. 1 is adapted to allow reports stored in database 106 to be searched via user devices 118. In an exemplary embodiment, search service 116 is adapted to search database 106 for reports containing certain content. In another embodiment, search service 116 is adapted to search database 106 for reports by relation to historian entities involved in the reports. In an embodiment, search service 116 comprises processor-executable instructions embodied on a storage memory device to provide search service 116 via a software environment. For example, search service 116 may be provided as processor-executable instructions that comprise a procedure, a function, a routine, a method, and/or a subprogram utilized independently or in conjunction with additional aspects of system 100 by computing device 103 according to an exemplary embodiment of the disclosure. Further details of search service 116 are provided herein.

The user devices 118 of FIG. 1 are adapted to receive from and transmit data to user-specific report collection 110, general report collection 112, alert service 114, and/or search service 116. In an embodiment, user devices 118 are also adapted to provide feedback on usage characteristics of the user devices 118 to curating service 108. Exemplary user devices 118 include, but are not limited to, personal computers, laptops, tablet computers, mobile communication devices, smartphones, and the like.

Figure 3:
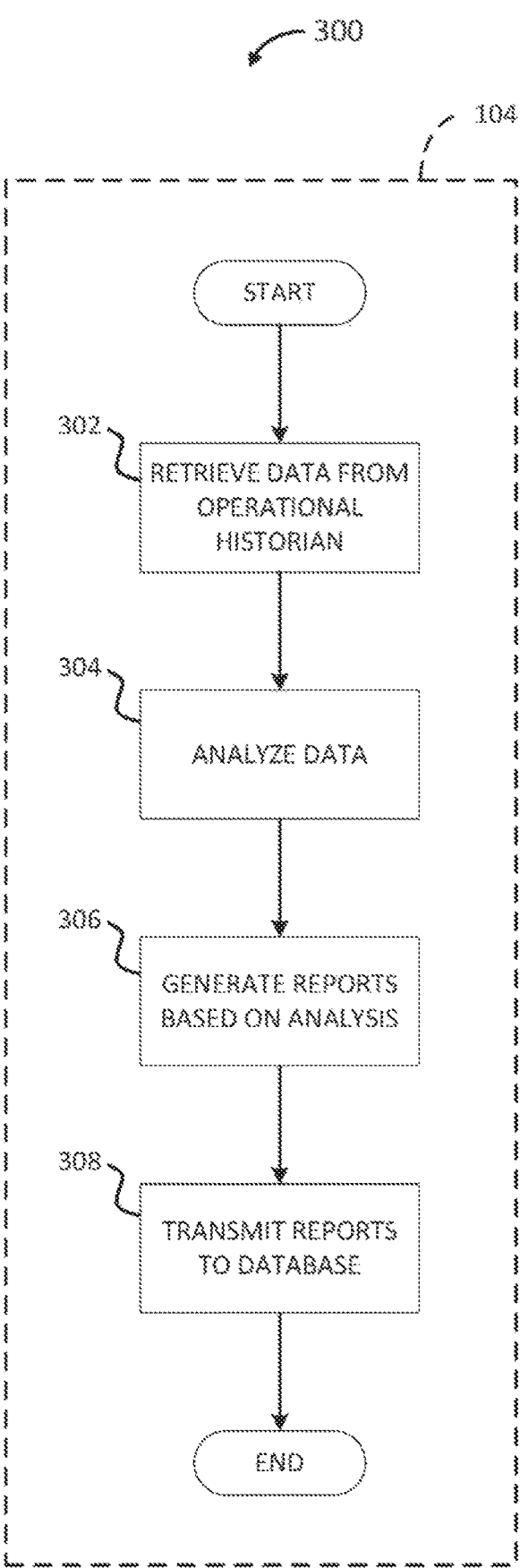
FIG. 3 is an exemplary flow diagram illustrating an operation of the reporting service of FIG. 2.

FIG. 3 illustrates an exemplary operation 300 of an embodiment of reporting service 104. The reporting service 104 retrieves data from operational historian 102 at step 302. For example, reporting service 104 may generate a request, including a query, for data and transmit the request to operational historian 102. Upon receiving the request, operational historian 102 determines which stored data matches the query and transmits that data to reporting service 104, which receives that data to complete the retrieval step 302. In another embodiment, operational historian 102 transmits all newly stored data to reporting service 104 without a specific request or query from reporting service 104. In an embodiment, the data stored by operational historian 102 and retrieved (e.g., received) by reporting service 104 relates to process control tags associated with a process control system of an industrial process. At step 304, reporting service 104 analyzes the retrieved data. The analysis performed by reporting service 104 includes, for example, performing statistical algorithms and/or machine learning algorithms to detect patterns and/or non-conformities with patterns in the data according to aspects of the disclosure. In an embodiment, reporting service 104 determines and generates a prediction model representative of expected values of the process control tags during step 304. For example, reporting service 104 may detect tag values that do not conform to a prediction model in order to identify information of interest to users of aspects of system 100.

Referring again to the embodiment illustrated by FIG. 3, reporting service 104 generates reports based on the analysis of the data at step 306. In an embodiment, reporting service 104 generates reports about detected patterns and/or non-conformities with patterns in the data. In another embodiment, reporting service 104 generates reports including identified information of interest to users of aspects of system 100. For example, the reports may include text, graphics, metadata, multimedia items, and the like that facilitate conveying characteristics of detected patterns and/or non-conformities (e.g., anomalies, deviations, etc.) in the data to users via user devices 118 and/or facilitate organizing or indexing the reports for access by devices including user devices 118. The reporting service 104 transmits (e.g., publishes) generated reports to report database 106 at step 308. The report database 106 stores the reports for access by various devices or services, including curating service 108 and search service 116. In an embodiment, a processor executing the operations of FIG. 4 constitutes a special purpose computer for receiving historical data for analysis, receiving current data for analysis, analyzing the historical data to determine a pattern in the values of the process control tags over the previous intervals of time, detecting that the value of the current data is anomalous relative to the pattern to identify information of interest to one or more users, and publishing at least one report indicative of the detected non-conforming tag value into a report database.

Figure 4:
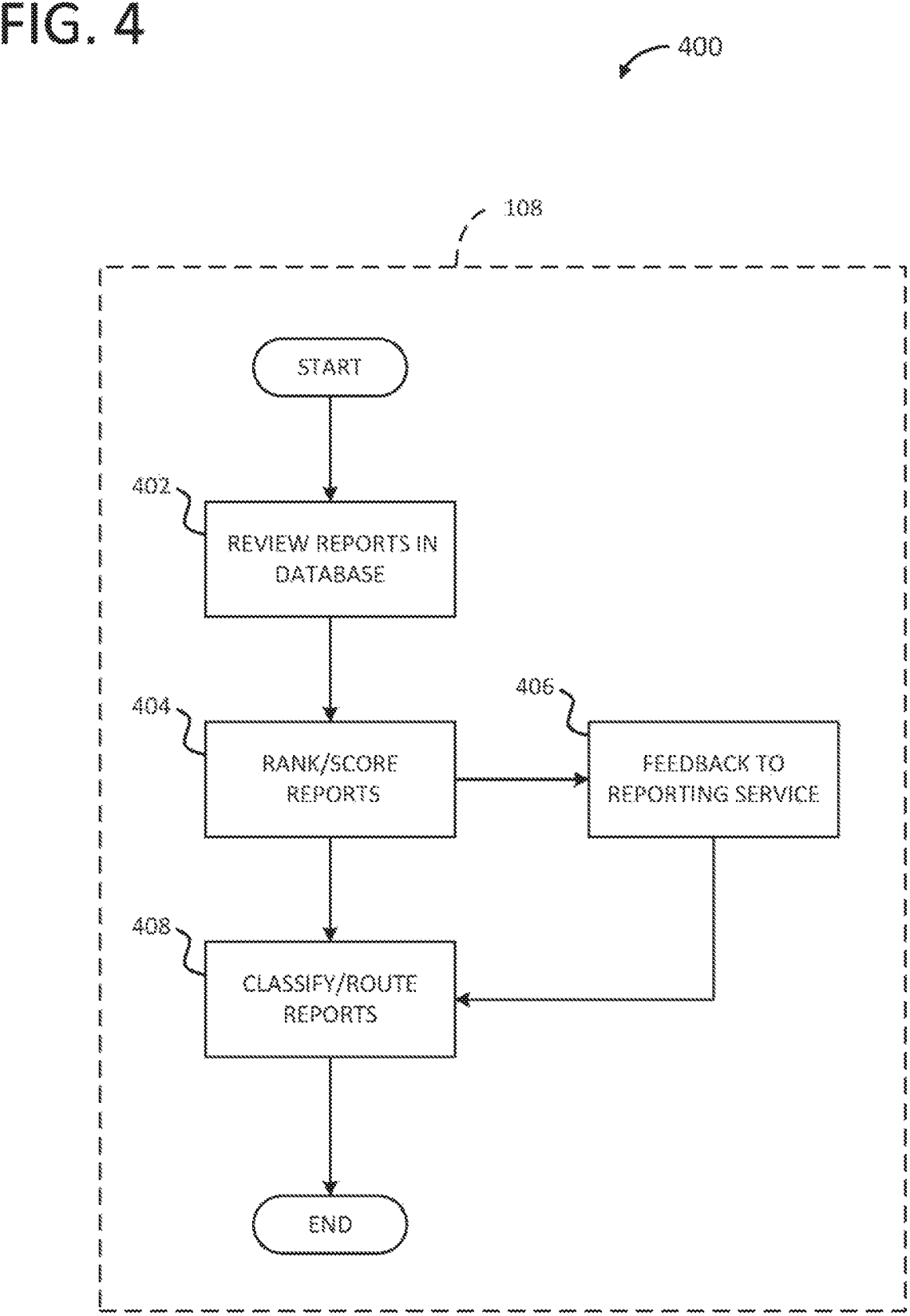
FIG. 4 is an exemplary flow diagram illustrating an operation of a curating service of the operational historian data pattern detection and communication services system of FIG. 1.

FIG. 4 illustrates an exemplary operation 400 of an embodiment of curating service 108. The curating service 108 reviews reports stored in database 106 at step 402. For example, curating service 108 retrieves reports from database 106 and/or accesses reports stored in database 106. At step 404, curating service 108 analyzes reports stored in database 106 and scores and/or ranks the reports according to passive system evaluation factors, passive user action evaluation factors, and/or active (e.g., deliberate) user action evaluation factors as further described herein. In an embodiment, curating service 108 makes report scores/rankings available to reporting service 104 in a feedback loop at step 406. For example, curating service 108 transmits scores/rankings to reporting service 104 or reporting service 104 sends a request to curating service 108 for scores/rankings. At step 408, curating service 108 classifies and/or routes reports according to a general interest level, a user-specific interest level, and/or an urgency level as further described herein. In an embodiment, a processor executing the operations of FIG. 4 constitutes a special purpose computer for retrieving reports from the report database, assigning a score to each retrieved report based on at least one of an interest level value and an urgency value, and routing a scored report to a user device when the score thereof is equal to or greater than a threshold value.

Figure 5:
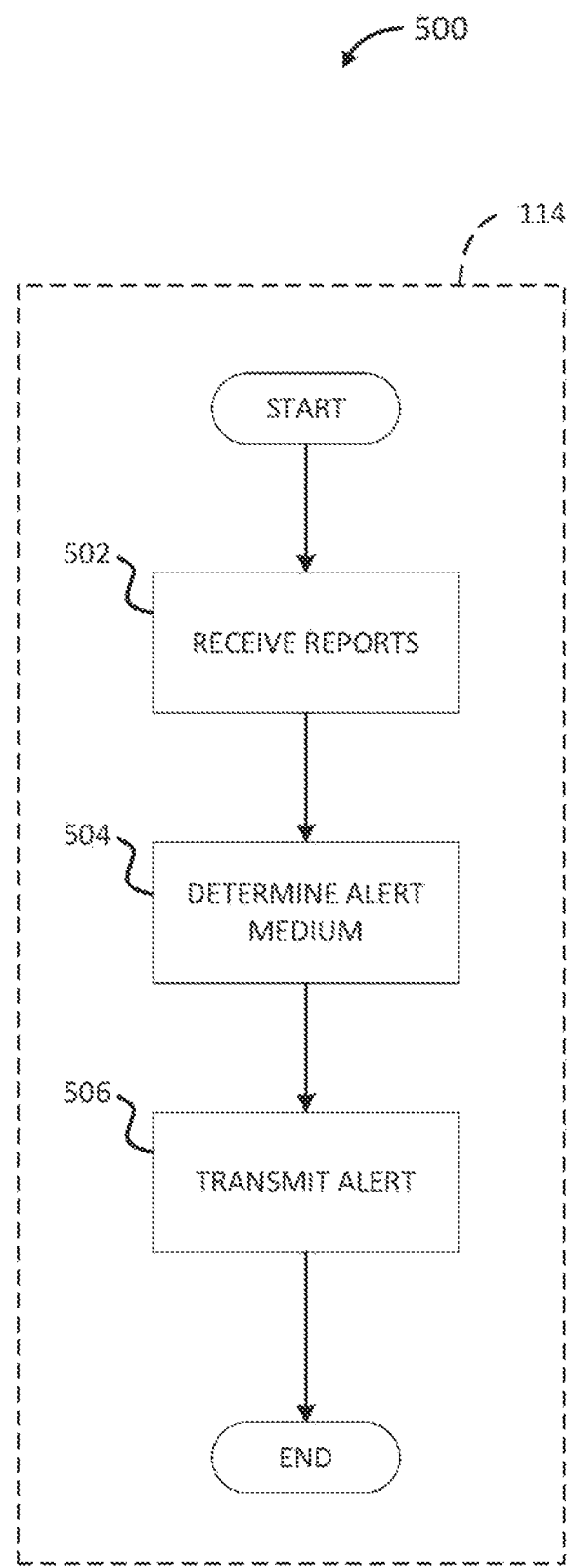
FIG. 5 is an exemplary flow diagram illustrating an operation of an alert service of the operational historian data pattern detection and communication services system of FIG. 1

FIG. 5 illustrates an exemplary operation 500 of an embodiment of alert service 114. The alert service 114 receives reports from curating service 108 at step 502. For example, based on a score or ranking of a report, curating service 108 is configured to classify the report as needing to be communicated to one or more user devices 118 (e.g., a user or group of users) via an alert and thus routes the report to alert service 114. After receiving the alert, alert service 114 uses data about the intended user devices 118 to determine an appropriate alert medium for the intended user devices 118 at step 504. For example, one user device 118 may be associated with a preference for a text message while another user device 118 may be associated with a preference for an email or phone notification. After determining the appropriate alert medium, alert service 114 transmits the alert via the appropriate medium to the intended user devices 118 at step 506.

Figure 6:
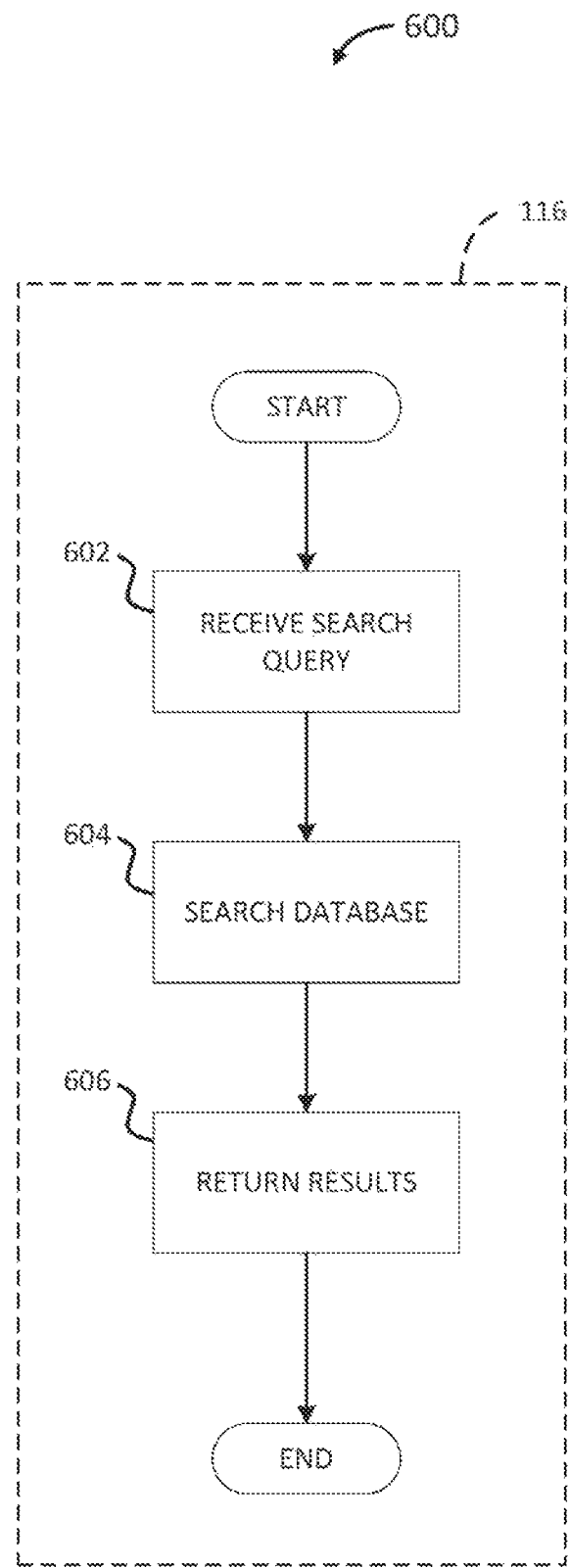
FIG. 6 is an exemplary flow diagram illustrating an operation of a search service of the operational historian data pattern detection and communication services system of FIG. 1

FIG. 6 illustrates an exemplary operation 600 of an embodiment of search service 116. The search service 116 receives a search query from one or more user devices 118 at step 602. At step 604, search service 116 uses the search query to search for data stored in database 106 that matches the query. Upon determining data that matches the query, search service 116 returns (e.g., transmits) the search results to the requesting user device 118 at step 606.

Figure 7:
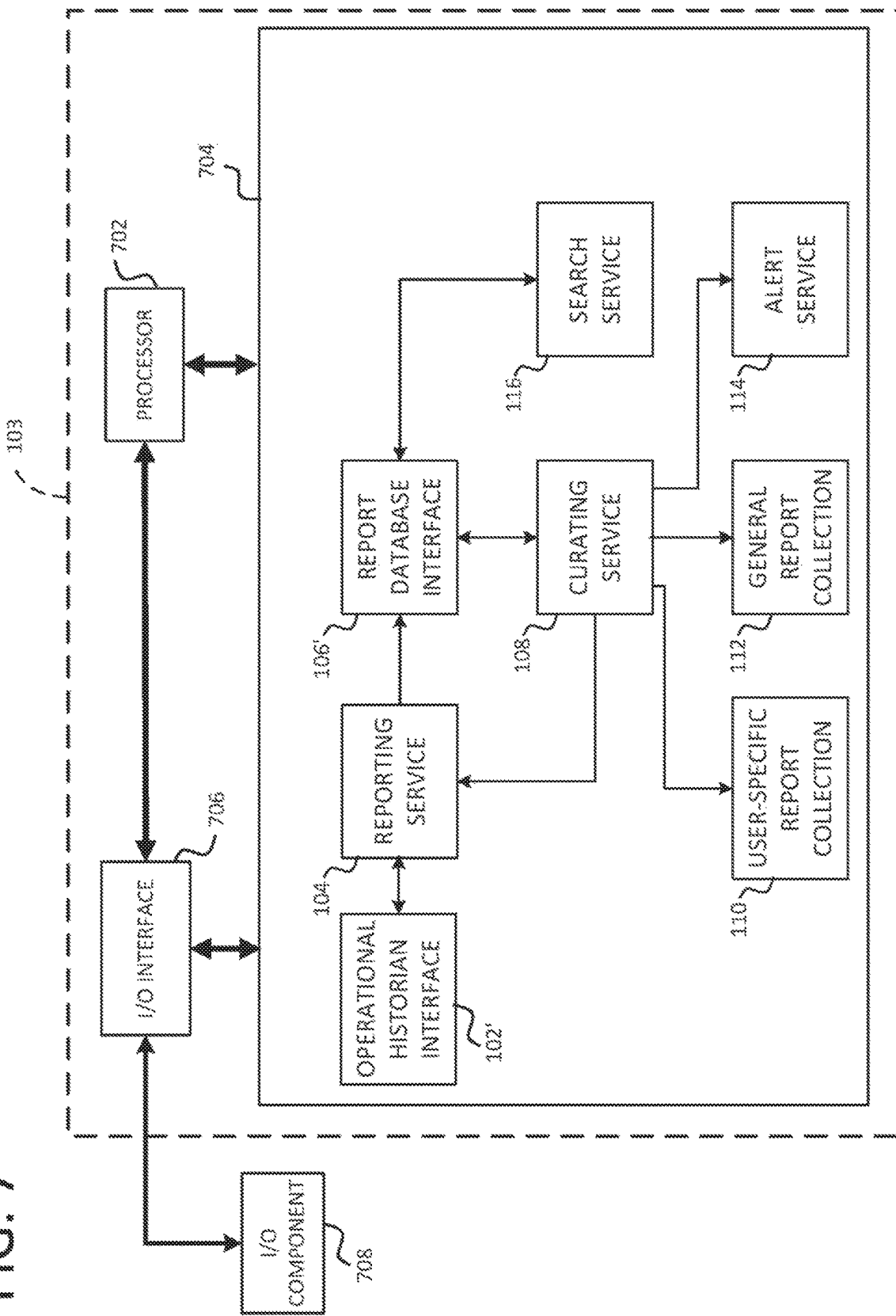
FIG. 7 illustrates an exemplary architecture of a computing device programmed to provide aspects of the operational historian data pattern detection and communication services system of FIG. 1.

FIG. 7 illustrates an exemplary architecture of computing device 103 programmed to provide aspects of the operational historian data pattern detection and communication services system 100 via a software environment. In this embodiment, computing device 103 includes a processor 702, a memory 704, and an input/output (I/O) interface 706 that interfaces with an I/O component 708. The memory 704 includes an operational historian interface 102', reporting service 104, a report database 106', curating service 108, user-specific report collection 110, general report collection 112, alert service 114, and search service 116 each embodied in processor-executable instructions for executing by processor 702.

The processor 702, memory 704, and I/O interface 706 are communicatively connected and/or electrically connected to each other. The I/O interface 706 is communicatively and/or electrically connected to the I/O component 708. The processor 702 is adapted to execute processor-executable instructions stored in the memory 704 for implementing the operational historian interface 102', reporting service 104, report database interface 106', curating service 108, user-specific report collection 110, general report collection 112, alert service 114, and/or search service 116. The I/O interface 706 of FIG. 7 provides a physical data connection between computing device 103 and I/O component 708. In an embodiment, I/O interface 706 is a network interface card (NIC) or modem and I/O component 708 is a telecommunications network.

The operational historian interface 102' of FIG. 7 is adapted to provide a connection between computing device 103 and operational historian 102. In an exemplary embodiment, operational historian interface 102' retrieves and/or receives data from operational historian 102 via I/O interface 706, as further described herein. The report database interface 106' of FIG. 7 is adapted to provide a connection between computing device 103 and a computer-readable storage medium storing report databases 106. In an exemplary embodiment, report database interface 106' facilitates publishing of reports from reporting service 104 to report database 106 via I/O interface 706, as further described herein. In another embodiment, report database interface 106' facilitates access to report database 106 by curating service 108 and search service 116 via I/O interface 706, as further described herein.

Figure 8:
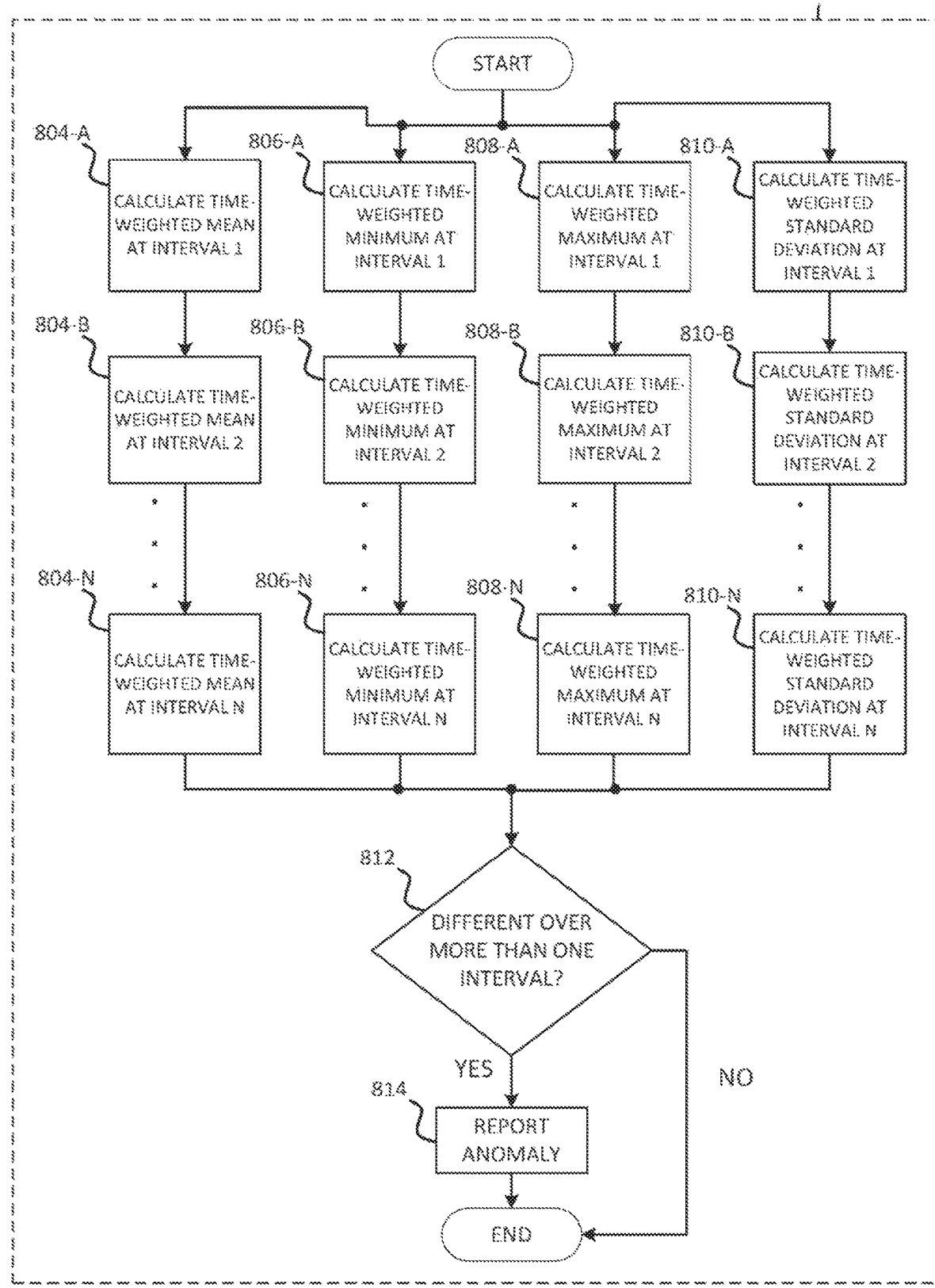
FIG. 8 is an exemplary flow diagram illustrating an operation of the reporting service to provide unsupervised anomaly detection in time-series data according to another embodiment.
Figure 9:
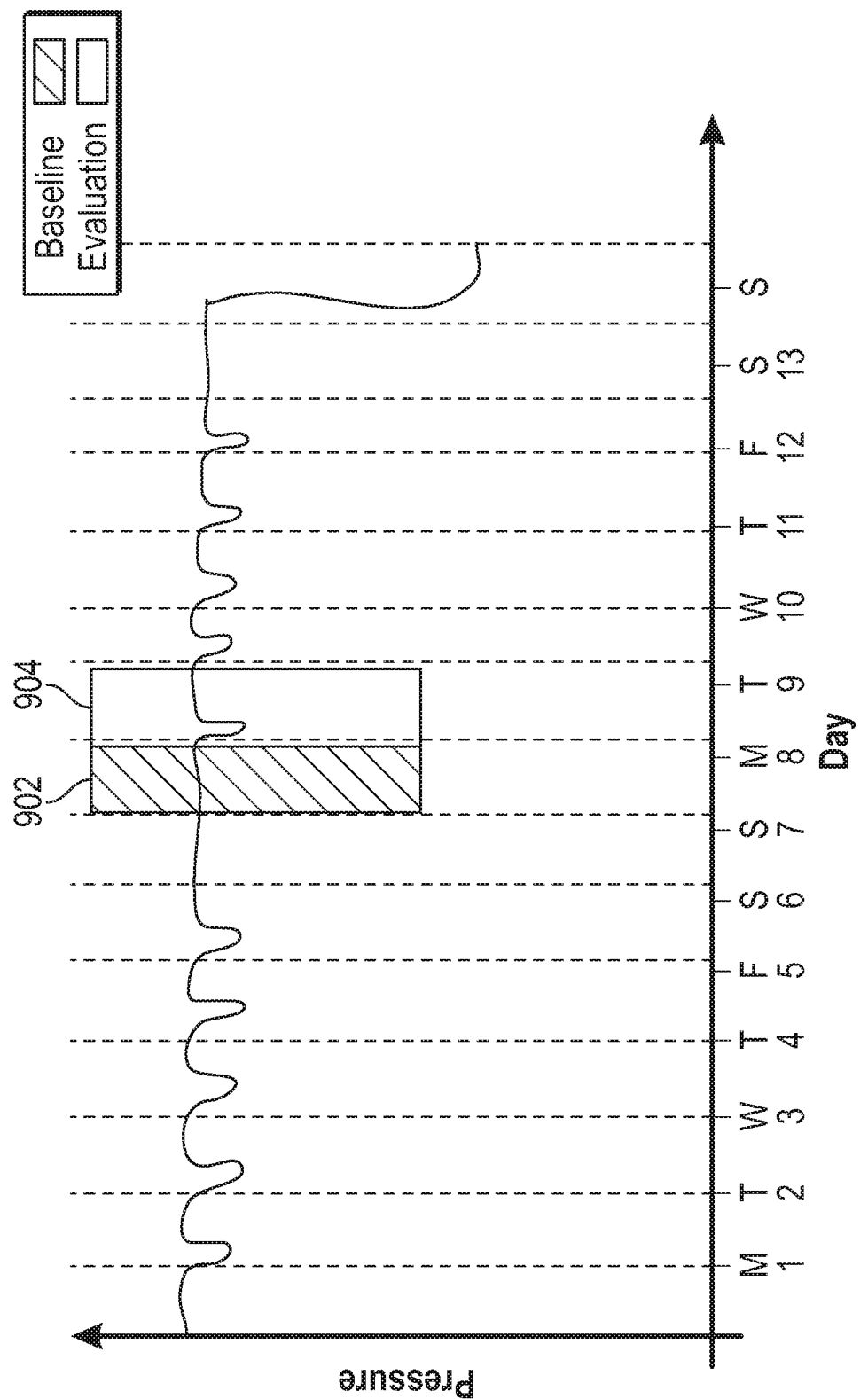
FIGS. 9-12 illustrate an exemplary pressure profile of a pipe in an industrial process that carries water over a period of days according to an embodiment.

FIG. 8 illustrates an exemplary operation of an embodiment of reporting service 104 in which reporting service 104 is adapted to provide unsupervised anomaly detection in time-series data based on statistical deviations (e.g., anomalies) at certain intervals. For example, instead of solely relying on alarm limits to detect anomalies in data stored in operational historian 102, an embodiment of reporting service 104 utilizes statistical methods to determine when a significant change has occurred in the characteristics of a signal indicative of a property of an industrial process, as represented by data stored in operational historian 102. Upon determining such a significant change, reporting service 104 generates a report including information about the change and publishes the report to report database 106 for review by users or other systems (e.g., curating service 108) to determine if the change represents a problem and/or interesting condition with respect to the industrial process. In an embodiment, reporting service 104 checks for anomalies against different common intervals (e.g., time periods) for the particular type of data rather than exclusively utilizing the most recent data from operational historian 102.

An exemplary situation involves an industrial process that includes a pipe for conveying a pressurized fluid. A leak in the pipe may cause a small drop in pressure, but if the pressure is still in an acceptable range a conventional system based on alarm limits may fail to detect the leak. In contrast, an embodiment of reporting service 104 adapted to conduct a statistical analysis in accordance with FIG. 8 detects that the pressure within the pipe is outside of a normal range without needing specific limits to be preconfigured. Upon retrieving data values from operational historian 102, reporting service 104 calculates a time-weighted mean value over a first interval at step 804-A, a time-weighted minimum value over the first interval at step 806-A, a time-weighted maximum value over the first interval at step 808-A, and a time-weighted standard deviation value over the first interval at step 810-A. The reporting service then calculates a time-weighted mean value over a second interval at step 804-B, a time-weighted minimum value over the second interval at step 806-B, a time-weighted maximum value over the second interval at step 808-B, and a time-weighted standard deviation value over the second interval at step 810-B. In one embodiment, reporting service 104 only calculates the values over two time intervals. In another embodiment, reporting service 104 calculates the values over additional time intervals. Exemplary intervals include a previous hour, a previous day, a previous week, a previous two weeks, and a previous month (e.g., the same day in the previous month). Other exemplary intervals include a previous shift, a previous batch run, and the like.

Still referring to FIG. 8, reporting service 104 determines, at step 812, whether the calculated values (e.g., mean values, minimum values, maximum values, standard deviation values) differ by more than a predetermined amount over more than one interval, which indicates an anomaly. For example, reporting service 104 may determine whether the calculated values over the multiple time periods differ by more than two standard deviations. When reporting service 104 determines that the calculated values differ by more than the predetermined amount, and thus indicates an anomaly, reporting service 104 generates a report including information about the anomaly and publishes (e.g., transmits and stores) the report to report database 106 at step 814.

Figure 10:
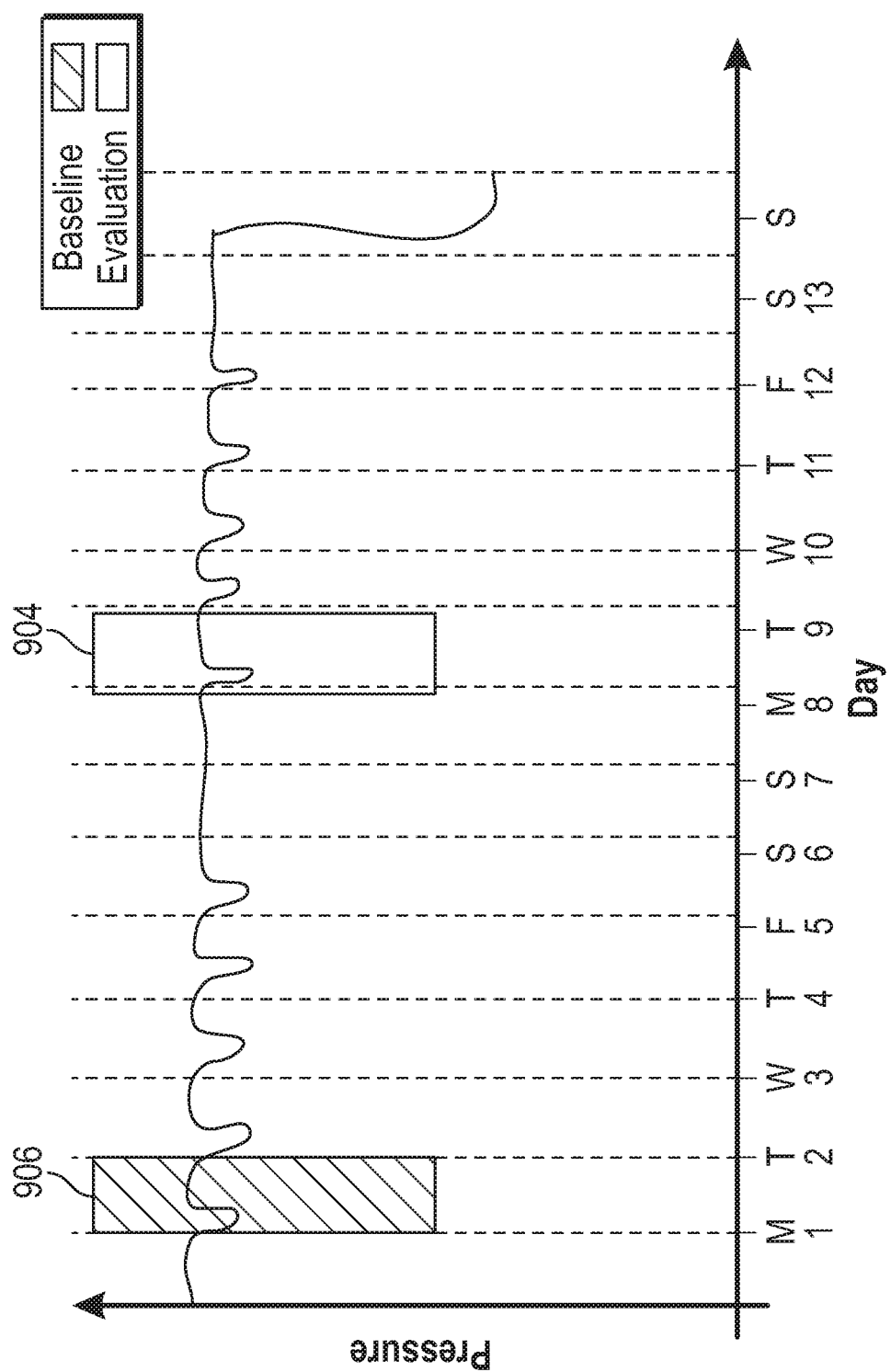
Figure 11:
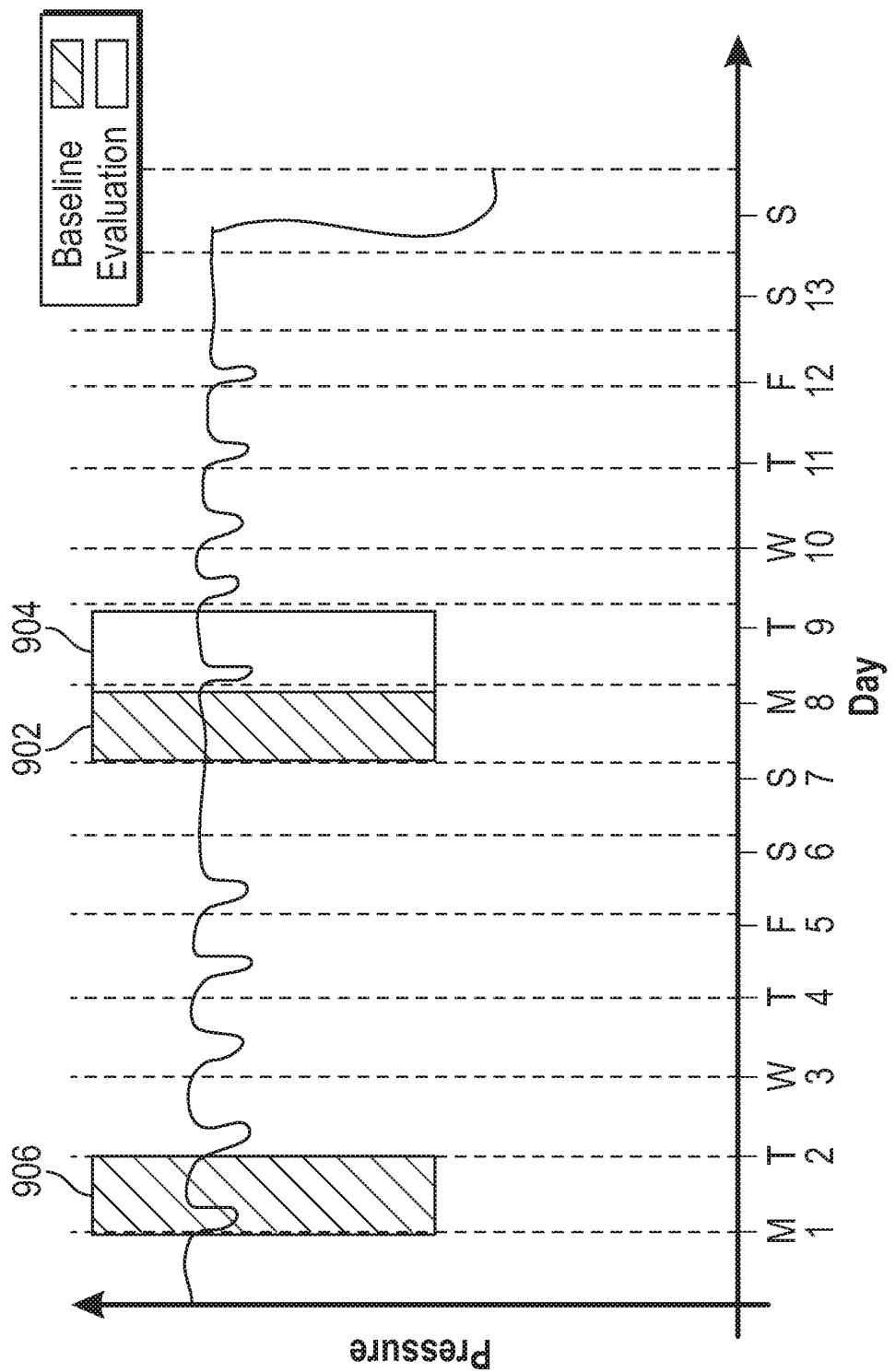

FIGS. 9-12 illustrate an exemplary pressure profile of a pipe in an industrial process that carries water over a period of days. Utilizing the pressure profile only during the time period generally indicated at 902 as a baseline, reporting service 104 determines that an anomaly occurs during the time period generally indicated at 904 because the pressure profile during period 904 differs from the pressure profile during period 902 by more than a certain predetermined amount. However, as illustrated by FIG. 10, upon comparing the pressure profile during period 904 to the pressure profile during period 906 (e.g., a different baseline), reporting service 104 determines that an anomaly has not occurred during period 904 because it does not differ from the pressure profile during period 906 by more than the predetermined amount. As illustrated by FIG. 11, when reporting service 104 compares the pressure profile during period 904 to pressure profiles across multiple intervals (e.g., both period 902 and period 906), reporting service 104 determines that the pressure profile during period 904 does not present an anomaly because the pressure profile is not different over more than one interval and thus does not generate or publish a report.

Figure 12:
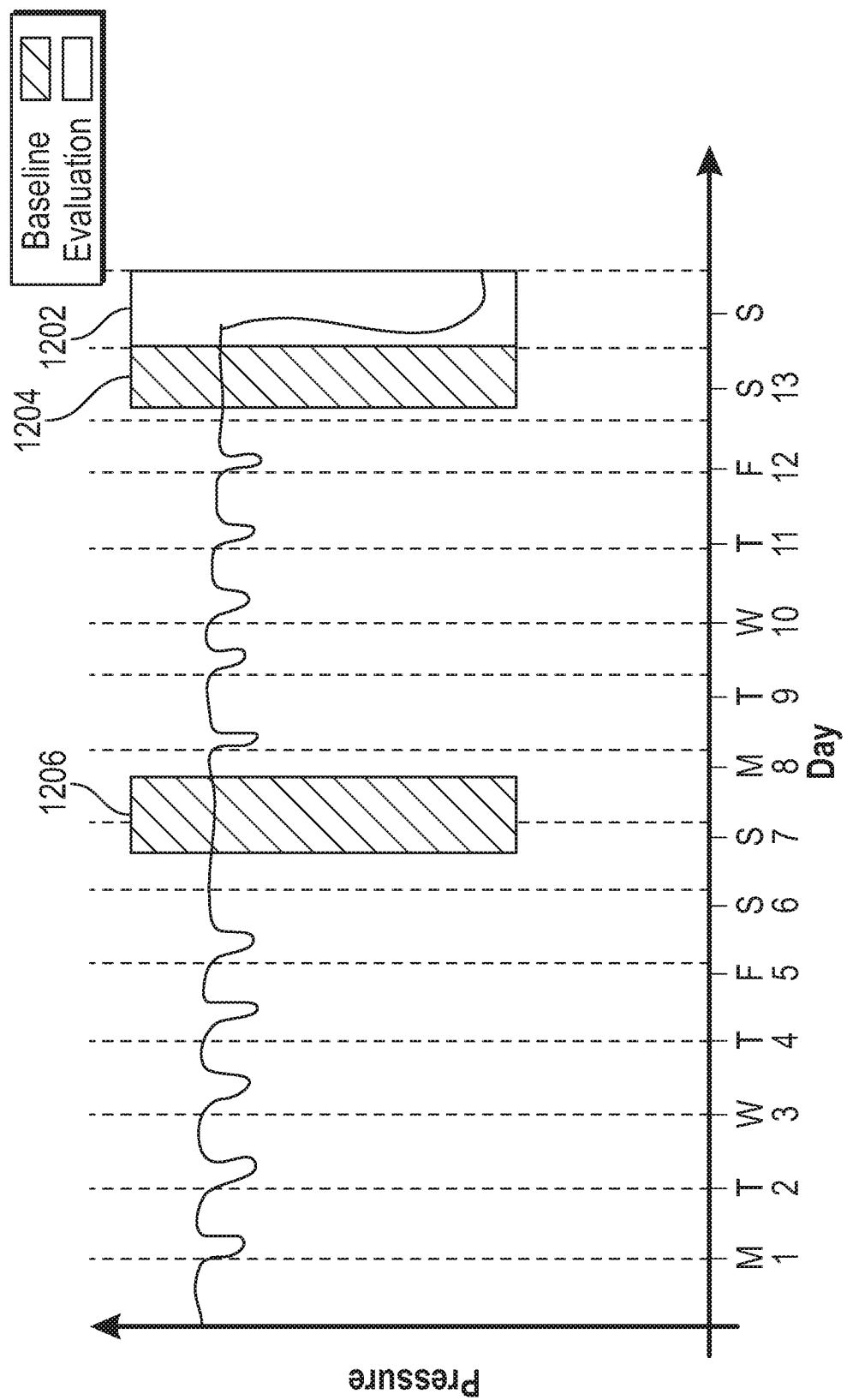

Referring now to FIG. 12, reporting service 104 compares the pressure profile of period 1202 to the pressure profiles at periods 1204 and 1206. The reporting service 104 determines that the pressure profile during period 1202 differs from both the pressure profile during period 1204 and the pressure profile during period 1206 by more than a certain amount. Thus, reporting service 104 generates a report including the anomaly detected at period 1202 and publishes the report to report database 106. In an embodiment, reporting service 104 combines statistical detection with similar periods at natural period boundaries to improve the operation of anomaly detectors.

Figure 13:
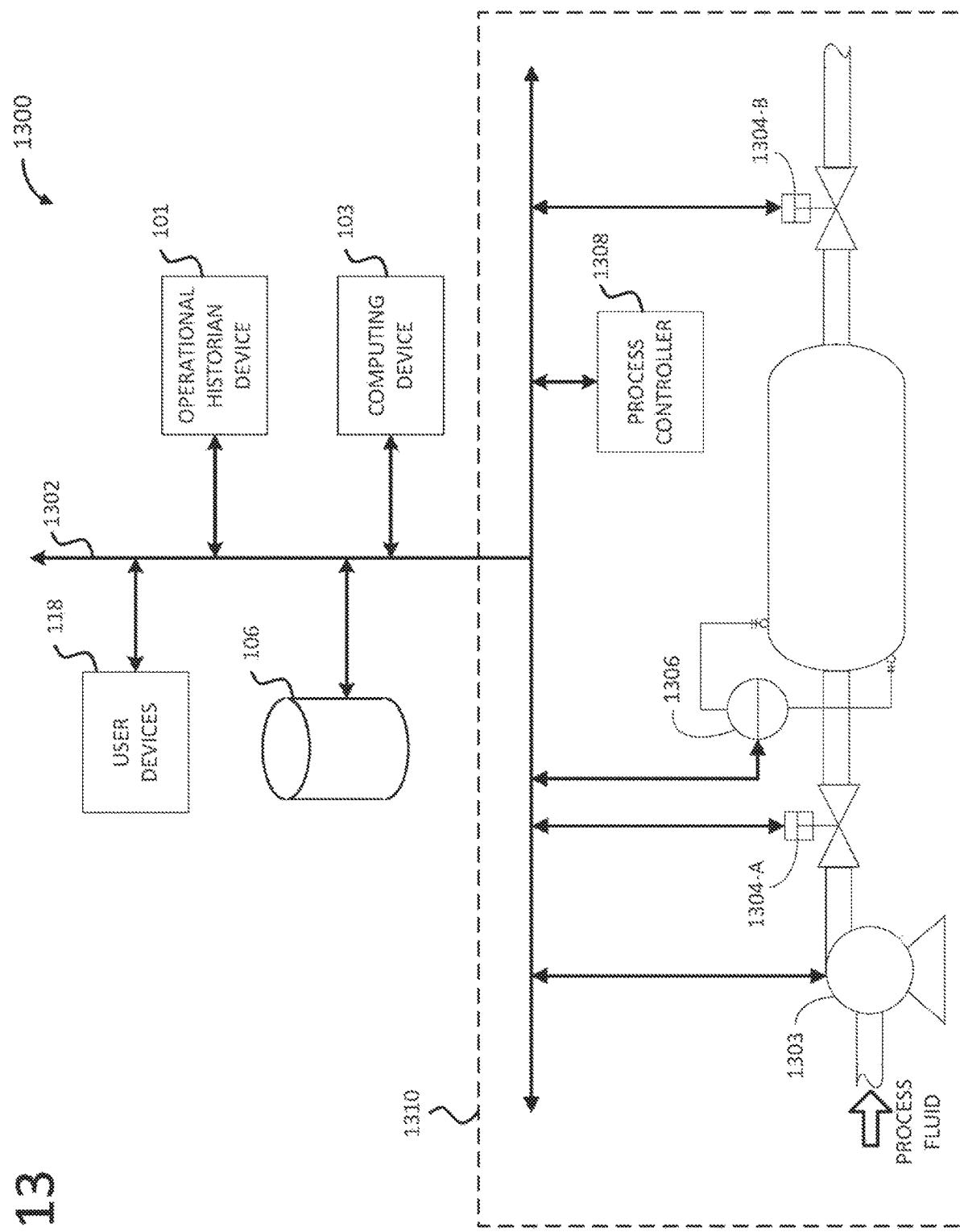
FIG. 13 illustrates an exemplary industrial process system within which aspects of the disclosure may be incorporated.

FIG. 13 illustrates an exemplary industrial process system 1300 within which aspects of the disclosure may be incorporated. The system 1300 includes computing device 103, operational historian device 101, report database 106, user devices 118, a communication network 1302, and an exemplary fluid processing system 1310. The operational historian device 101 further includes operational historian 102. The fluid processing system 1310 of the exemplary embodiment of FIG. 13 further includes a pump 1303, valves 1304, a sensor 1306, and process controller 1308. In system 1300, computing device 103, operational historian device 101, report database 106, user devices 118, and various components of the fluid processing system 1310 (e.g., pump 1303, valves 1304, sensor 1306, process controller 1308) are communicatively connected via the communication network 1302.

The communication network 1302 is capable of facilitating the exchange of data among historian device 101, computing device 103, report database 106, user devices 118, and components of fluid processing system 1310. The communication network 1302 in the embodiment of FIG. 13 is a local area network (LAN) that is connectable to other telecommunications networks, including other LANs or portions of the Internet or an intranet. The communication network 1302 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communication network 1302 is any medium that allows data to be physically transferred through serial or parallel communication channels (e.g., copper, wire, optical fiber, computer bus, wireless communication channel, etc.). In an embodiment, communication network 1302 comprises at least in part a process control network.

The historian device 101 is adapted to provide operational historian 102, which is adapted to store (e.g., "historize") various types of data related to fluid processing system 1310, as further described herein. The computing device 103 is adapted to provide reporting service 104, report database 106 (or an interface to a computer-readable storage medium storing report database 106), curating service 108, user-specific report collection 110, general report collection 112, alert service 114, and search service 116, as further described herein. The report database 106 is adapted to store reports generated by reporting service 104 as an organized collection of data, as further described herein. The user devices 118 are adapted to receive from and transmit data to user-specific report collection 110, general report collection 112, alert service 114, and/or search service 116, as further described herein.

Still referring to FIG. 13, fluid processing system 1310 is adapted for changing or refining raw materials to create end products. It will be apparent to one skilled in the art that aspects of the present disclosure are capable of optimizing processes and processing systems other than fluid processing system 1310 and that system 1310 is presented for illustration purposes only. Additional exemplary processes include, but are not limited to, those in the chemical, oil and gas, food and beverage, pharmaceutical, water treatment, and power industries. In an embodiment, process controller 1308 provides an interface or gateway between components of fluid processing system 1310 (e.g., pump 1303, valves 1304, sensor 1306) and other components of system 1300 (e.g., historian device 101, computing device 103, report database 106, user devices 118). In another embodiment, components of fluid processing system 1310 communicate directly with historian device 101, computing device 103, report database 106, and user devices 118 via communication network 1302. In yet another embodiment, process controller 1308 transmits data to and receives data from pump 1303, valves 1304, and sensor 1306 for controlling and/or monitoring various aspects of fluid processing system 1310.

Figure 14:
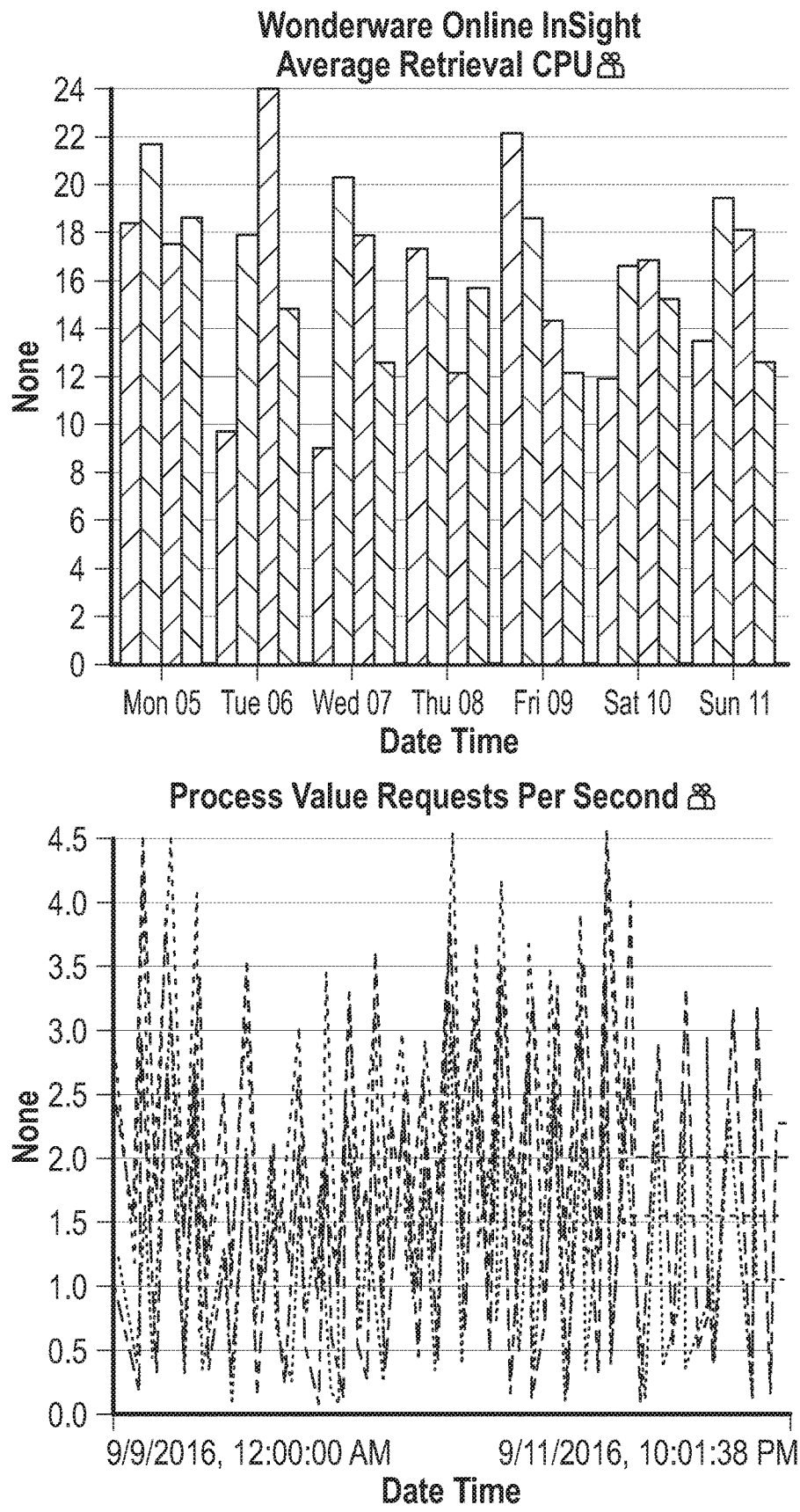
FIG. 14 illustrates an exemplary display of a user-specific report collection and/or a general report collection displayed by a graphical user interface according to an embodiment.
Figure 14:
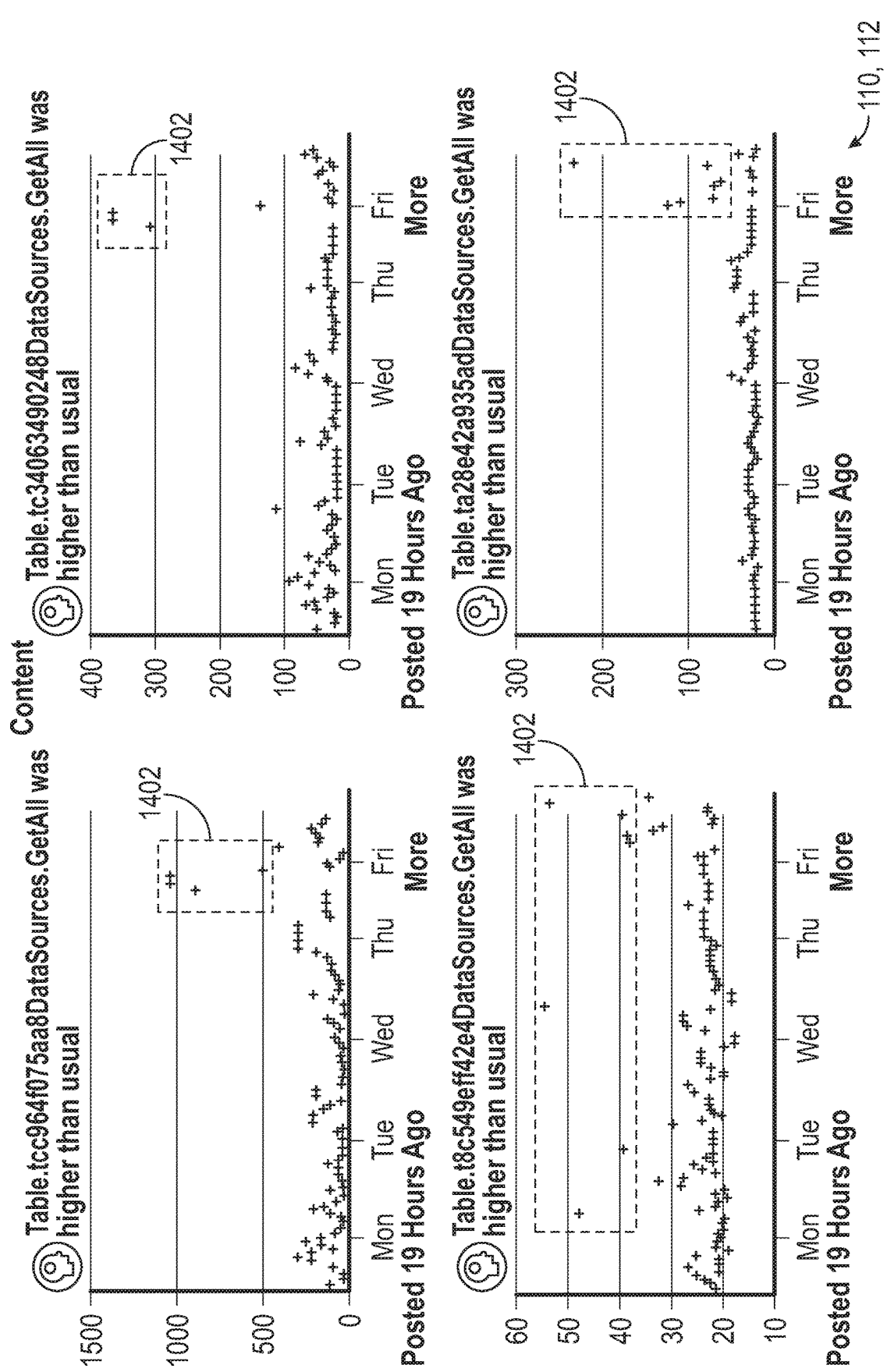

FIG. 14 illustrates an exemplary display of user-specific report collection 110 and/or general report collection 112 displayed by a graphical user interface of user devices 118. The exemplary display notifies user devices 118 of significant events related to an industrial process. In an embodiment, the user interface provides a status indicator when there are new reports available. Selecting the status indicator (e.g., clicking, tapping, etc.) via user devices 118 causes user devices 118 to display the selected report. As indicated at 1402, the display of user-specific report collection 110 and/or general report collection 112 includes a graphical indication (e.g., plotted data points) of anomalous data values. In an embodiment, the graphical representations of the anomalous data values are a different color from the graphical representations of the non-anomalous data values. For example, the graphical representations of the anomalous data values may be red and the graphical representations of the non-anomalous data values may be green. In accordance with an aspect of the disclosure, graphically differentiating anomalous data values from non-anomalous data values enables users of user devices 118 to readily identify abnormal operating ranges of an industrial process (e.g., fluid processing system 1310).

In an exemplary embodiment of aspects of the disclosure, two reporting services 104 are utilized. Both reporting services 104 use managed historian data to publish reports. Key Performance Indicator (KPI) monitoring reports on performance based on predefined KPIs and anomaly detection that analyzes data from operational historian 102 for anything out of the normal and reports it. Reporting service 104 and curating service 108 generate and distribute reports on a daily basis reporting how a process control environment of an industrial process is doing compared to the KPI goals. In an embodiment, a user device 118 searches for "higher than usual" via search service 116 and displays many stories on a particular date saying "yesterday xxx was higher than usual." It turns out that the yesterday in point was the particular date and thus the anomaly detector detected the anomaly. In an embodiment, aspects of the disclosure may be utilized in an Internet of Things (IoT) environment.

In an embodiment, aspects of the disclosure are utilized with user devices 118 embodied as mobile devices with mobile apps. For example, aspects of the disclosure may be installed via app stores and aspects may be optimized for touchscreen embodiments. In other embodiments, aspects of the disclosure may be browser-based (e.g., served application that showcases historian capabilities). In an embodiment, aspects of the disclosure may be used as a productivity tool to allow debugging and analysis for custom applications. In an embodiment, aspects of the disclosure take advantage of capabilities including leveraging summary tags, leveraging model view and derivation view, and leveraging flexible events, data dictionary, and IHistory. Aspects of the disclosure utilize a technology stack including an HTML5 app (e.g., Angular.js and D3), modular components, and a managed historian. Aspects of the disclosure are component-based (e.g., value and time axis pieces can be shared between all chart types). Exemplary modular components include charts, trends, grids, and the like.

Aspects of the disclosure include a method of detecting operational changes in an industrial process. The method comprises: receiving, by a reporting service, historical data for analysis, the historical data being stored in an operational historian associated with a process control system, the historical data relating to a plurality of values of a process control tag, each value corresponding to a previous interval of time, and the reporting service comprising processor-executable instructions executing on a processor; receiving, by the reporting service, current data for analysis, the current data being stored in the operational historian, and the current data relating to a value of the process control tag at a current interval of time; analyzing, by the reporting service, the historical data to determine a pattern in the values of the process control tags over the previous intervals of time; detecting, by the reporting service, that the value of the current data is anomalous relative to the pattern to identify information of interest to one or more users; and publishing, by the reporting service, at least one report indicative of the detected non-conforming tag value into a report database.

In an embodiment, the historical data comprises at least one of time series data, metadata, and event data.

In an embodiment, the previous intervals of time are at least one of one day, one week, two weeks, and one month.

In an embodiment, analyzing the historical data comprises performing a statistical analysis of the historical data for each previous interval of time to determine the pattern from the historical data.

In an embodiment, the statistical analysis comprises at least one of a time-weighted mean value analysis, a time-weighted minimum value analysis, a time-weighted maximum value analysis, and a time-weighted standard deviation analysis.

In an embodiment, detecting that the value of the current data is anomalous comprises determining the statistically analyzed historical data differs by more than a predetermined amount over more than one of the intervals of time.

In an embodiment, analyzing the historical data comprises executing a machine learning analysis to identify a correlation among two or more values of the process control tag over the previous intervals of time.

In an embodiment, executing the machine learning analysis comprises: training a prediction model representative of expected values of the process control tag over the previous intervals of time; testing the prediction model against a test dataset; and monitoring the historical data for the anomalous tag value.

In an embodiment, the previous intervals of time are at least one of one day, one week, two weeks, and one month.

In an embodiment, said receiving historical data, said receiving current data, said analyzing, said detecting, and said publishing are each performed in real-time during the current interval of time.

Aspects of the disclosure also include a system comprising: a processor; a computer-readable storage device; and a reporting service, wherein the reporting service comprises processor-executable instructions stored on the computer-readable storage device, wherein said instructions include instructions for, when executed by the processor: receiving historical data for analysis from an operational historian, the historical data relating to a plurality of values of a process control tag associated with a process control system, each value corresponding to a previous interval of time, receiving current data for analysis, the current data relating to a value of the process control tag at a current interval of time, analyzing the historical data to determine a pattern in the process control tag values over the previous intervals of time; detecting that the value of the current data is anomalous relative to the pattern to identify information of interest to one or more users, and publishing at least one report indicative of the detected anomalous tag value relating to the current data.

In an embodiment, the historical data comprises at least one of time series data, metadata, and event data.

In an embodiment, the previous intervals of time are at least one of one day, one week, two weeks, and one month.

In an embodiment, analyzing the historical data comprises performing a statistical analysis of the historical data for each previous interval of time to determine the pattern from the historical data.

In an embodiment, the statistical analysis comprises at least one of a time-weighted mean value analysis, a time-weighted minimum value analysis, a time-weighted maximum value analysis, and a time-weighted standard deviation analysis.

In an embodiment, detecting that the value of the current data is anomalous comprises determining the statistically analyzed historical data differs by more than a predetermined amount over more than one of the intervals of time.

In an embodiment, analyzing the historical data comprises executing a machine learning analysis to identify a correlation among two or more values of the process control tag over the previous intervals of time.

In an embodiment, executing the machine learning analysis comprises: training a prediction model representative of expected values of the process control tag over the previous intervals of time; testing the prediction model against a test dataset; and monitoring the historical data for the anomalous tag value.

In an embodiment, the previous intervals of time are at least one of one day, one week, two weeks, and one month.

In an embodiment, said receiving historical data, said receiving current data, said analyzing, said detecting, and said publishing are each performed in real-time during the current interval of time.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
   retrieving, by a processor, electronic reports from a report database, each report comprises historical data relating to a plurality of process control tags associated with a process control system, the process control tags have values representative of at least one of a component of the process control system and a process variable, at least a portion of the values corresponding to an interval of time;
   analyzing, by the processor, the retrieved reports;
   detecting, by the processor, based on said analysis, one or more anomalies in the values based on statistical deviations at a plurality of time intervals, wherein at least one of the reports identifies information of interest indicative of at least one of the values at a current interval of time being anomalous relative to at least one of the values at a plurality of previous intervals of time;
   assigning, by the processor, a score to each retrieved report based on an interest level value and an urgency value, the interest level value based on the process tags and the urgency value based on a quantity of the reports stored in the report database over a period of time in association with said retrieval of the electronic reports; and
   routing, by the processor over a communications network, a scored report to a user device for display on a user device when the score thereof is at least equal to a threshold value.

2. The method of claim 1, wherein the interest level value is specific to a user associated with the user device, said specificity based on responsibility for a process control tag assigned to the user.

3. The method of claim 1, wherein the interest level value is based on at least one of tags on a same chart, tags on a same window, tags on a same analysis, mobile report tags, tags from a same data source, tags with similar names, tags with similar summary statistics, and correlated tags.

4. The method of claim 1, further comprising:
generating an alert associated with a scored report when the score thereof is at least equal to the threshold value; and
transmitting the alert to the user device, wherein the alert displays on the user device in response to said transmission.

5. The method of claim 1, further comprising receiving feedback from the user device.

6. The method of claim 5,
wherein the feedback includes at least one of selecting a report displayed on the user device, selecting a process control tag related to a process control tag associated with the report displayed on the user device, search history, polling, and actions by users similar to a user of the user device.

7. The method of claim 1, wherein said retrieving, assigning, and routing are each performed in real-time with an operation of a process controlled by the process control system.

8. A system comprising:
a processor; and
a non-transitory computer-readable storage device tangibly comprising processor-executable instructions stored thereon, wherein said instructions include instructions for, when executed by the processor:
storing a plurality of reports in a report database, each report comprises historical data relating to a plurality of process control tags associated with a process control system, the process control tags have values representative of at least one of a component of the process control system and a process variable, at least a portion of the values corresponding to an interval of time;
retrieving reports from the report database;
analyzing the retrieved reports;
detecting, based on the analysis, one or more anomalies in the values based on statistical deviations at a plurality of time intervals, wherein at least one of the reports identifies information of interest indicative of at least one of the values at a current interval of time being anomalous relative to at least one of the values at a plurality of previous intervals of time;
assigning a score to each retrieved report based on an interest level value and an urgency value, the interest level value based on the process tags and the urgency value based on a quantity of the reports stored in the report database over a period of time in association with said retrieval of the reports; and
routing, over a communications network, a scored report to a user device for display on the user device when the score thereof is equal to or greater than a threshold value.

9. The system of claim 8, wherein the interest level value is specific to a user associated with the user device, said specificity based on responsibility for a process control tag assigned to the user.

10. The system of claim 8, wherein the interest level value is based on at least one of tags on a same chart, tags on a same window, tags on a same analysis, mobile report tags, tags from a same data source, tags with similar names, tags with similar summary statistics, and correlated tags.

11. The system of claim 8, wherein said instructions include instructions for, when executed by the processor:
generating an alert associated with a scored report when the score thereof is greater than or equal to the threshold value; and
transmitting the alert to the user device, wherein the alert displays on the user device in response to said transmission.

12. The system of claim 8, wherein said instructions include instructions for, when executed by the processor, receiving feedback from the user device.

13. The system of claim 12, wherein the feedback includes at least one of selecting a report displayed on the user device, selecting a process control tag related to a process control tag associated with the report displayed on the user device, search history, polling, and actions by users similar to a user of the user device.

14. The system of claim 8, wherein said retrieving, assigning, and routing are each performed by the processor in real-time with an operation of a process controlled at least in part by the process control system.

* * * * *